(12) United States Patent
Le Faucheur

(10) Patent No.: US 8,050,641 B2
(45) Date of Patent: Nov. 1, 2011

(54) LIMITING THE POWER CONSUMPTION OF A WIRELESS ELECTRONIC SYSTEM

(75) Inventor: Laurent Le Faucheur, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 1086 days.

(21) Appl. No.: 11/771,672

(22) Filed: Jun. 29, 2007

(65) Prior Publication Data

US 2008/0182545 A1    Jul. 31, 2008

(30) Foreign Application Priority Data

Jan. 25, 2007  (EP) .................... 07290099

(51) Int. Cl.
*H04B 17/00* (2006.01)
(52) U.S. Cl. .............. 455/226.1; 455/343.1; 455/574
(58) Field of Classification Search .... 455/226.1–226.4, 455/343.1–343.6, 574; 370/313, 347, 311, 370/318, 95.3, 79, 345
See application file for complete search history.

(56) References Cited

U.S. PATENT DOCUMENTS

| | | | | |
|---|---|---|---|---|
| 5,570,369 A | * | 10/1996 | Jokinen | 370/311 |
| 5,930,706 A | * | 7/1999 | Raith | 455/343.1 |
| 7,630,701 B2 | * | 12/2009 | Sollenberger et al. | 455/343.3 |
| 7,715,333 B2 | * | 5/2010 | Binzel et al. | 370/311 |
| 2001/0023184 A1 | * | 9/2001 | Kalveram et al. | 455/426 |
| 2004/0253967 A1 | | 12/2004 | Patel et al. | |
| 2007/0184866 A1 | * | 8/2007 | Kim et al. | 370/345 |
| 2008/0311947 A1 | * | 12/2008 | Soerensen et al. | 455/574 |

FOREIGN PATENT DOCUMENTS

EP    1 160 993    12/2001

\* cited by examiner

*Primary Examiner* — Lana N Le
(74) *Attorney, Agent, or Firm* — Wade J. Brady, III; Frederick J. Telecky, Jr.

(57) ABSTRACT

In at least some disclosed embodiments, a wireless electronic system includes a decoder module coupled to a processor. The decoder module is configured to send a signal to the processor based on a less than completely acquired burst of data. The less than completely acquired burst of data is part of a complete burst of data, and the complete burst of data is contiguous. The processor causes a reduction in power consumption of the wireless electronic system based on the signal.

18 Claims, 2 Drawing Sheets

LIMITING THE POWER CONSUMPTION OF A WIRELESS ELECTRONIC SYSTEM

CROSS-REFERENCE TO RELATED APPLICATION

The present application claims priority to EP Application No. 07290099.6, filed on, Jan. 25, 2007 and entitled "Fast Paging For Low-Power Wireless Devices," which is hereby incorporated by reference.

BACKGROUND

At least some wireless electronic systems operate in either an active mode or an idle mode. In active mode, the wireless electronic system transmits and acquires data over a "traffic channel" opened between the wireless electronic system and a "base station." A traffic channel carries encoded speech or user data, and a base station comprises a radio transceiver in a fixed location. In idle mode, the wireless electronic system acquires data from the base station over a "control channel." A control channel carries data in the form of broadcast messages sent to each wireless electronic system within a certain distance from a base station. The broadcast messages occur approximately once every 2 seconds, and are not transmitted as a continuous stream of data, but as four "bursts" of data. A burst is a specified time of radio frequency transmission, and represents the physical content of a "timeslot." A timeslot is a discrete window of time, the duration of which is standardized to provide for regularity in communications. A timeslot has a duration of $3/5200$ seconds (577 µs), and is divided into 156.25 symbol periods. One symbol period is enough time to transmit one symbol of information, and for Gaussian minimum shift keying ("GMSK") modulation, a symbol is equivalent to a bit.

In order to acquire broadcast messages, a wireless electronic system provides power to embedded radio frequency ("RF") circuitry during the four bursts of each broadcast message. If the broadcast message contains a unique identifier associated with the wireless electronic system, the wireless electronic system will open a traffic channel with the base station to acquire encoded speech or user data. If the broadcast message contains a unique identifier associated with another wireless electronic system, or no unique identifiers at all, the original wireless electronic system need not take any action in response to the broadcast message. Because a small percentage of the total number of broadcast messages transmitted to a particular wireless electronic system daily is actually associated with that particular wireless electronic system, most broadcast messages require no further action from the wireless electronic system. If no further action is required, the RF circuitry is powered down after the four bursts are acquired until the next broadcast message arrives. As such, a significant amount of power is consumed by a wireless electronic system while acquiring messages of no consequence to that wireless electronic system.

SUMMARY

Systems and methods for limiting the power consumption of a communication system are described herein. In at least some disclosed embodiments, a wireless electronic system includes a decoder module coupled to a processor. The decoder module is configured to send a signal to the processor based on a less than completely acquired burst of data. The less than completely acquired burst of data is part of a complete burst of data, and the complete burst of data is contiguous. The processor causes a reduction in power consumption of the wireless electronic system based on the signal.

In other disclosed embodiments a method includes acquiring less than a complete burst of data. The less than completely acquired burst of data is part of a complete burst of data, and the complete burst of data is contiguous. The method also includes recognizing a message comprising the less than completely acquired burst of data, and reducing power in a wireless electronic system based on the message for any remainder of the message.

In yet other disclosed embodiments a decoder module includes a detector module configured to send a signal to a processor based on a less than completely acquired burst of data. The less than completely acquired burst of data is part of a complete burst of data, and the complete burst of data is contiguous. The detector module is also configured to send the signal based on radio conditions determined by the detector module.

In even further disclosed embodiments, a system includes a decoder module configured to acquire a less than complete burst of data. The less than complete burst of data is part of a complete burst of data, and the complete burst of data is contiguous. The decoder module is further configured to cease acquiring data from the complete burst and from a message comprising the less than complete burst of data upon recognizance of the message.

These and other features and advantages will be more clearly understood from the following detailed description taken in conjunction with the accompanying drawings and claims.

BRIEF DESCRIPTION OF THE DRAWINGS

For a more complete understanding of the present disclosure, reference is now made to the accompanying drawings and detailed description, wherein like reference numerals represent like parts.

NOTATION AND NOMENCLATURE

Certain terms are used throughout the following claims and discussion to refer to particular components. This document does not intend to distinguish between components that differ in name but not function. In the following discussion and in the claims, the terms "including" and "comprising" are used in an open-ended fashion, and thus should be interpreted to mean "including but not limited to". Also, the term "couple" or "couples" is intended to mean either an indirect or direct electrical connection. Thus, if a first device couples to a second device, that connection may be through a direct electrical connection, or through an indirect electrical connection via other devices and connections. Additionally, the term "system" refers to a collection of two or more hardware components, and may be used to refer to an electronic device such as a communication system, a portion of a communication system, a combination of communication systems, etc.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. The discussion of any embodiment is meant only to be illustrative of that embodiment, and not intended to intimate that the scope of the disclosure, including the claims, is limited to that embodiment.

Figure 1:
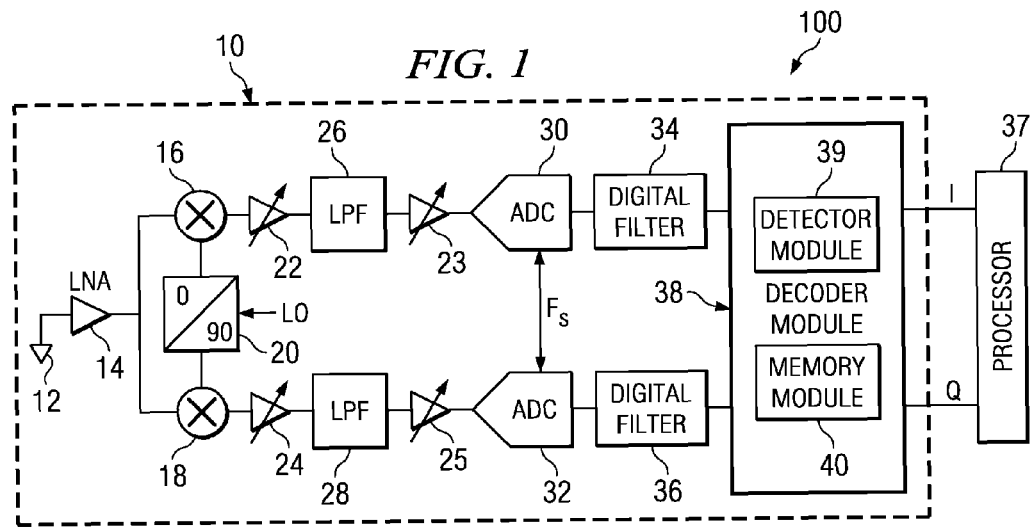
FIG. 1 illustrates RF circuitry within a wireless electronic system constructed in accordance with at least some illustrative embodiments.

FIG. 1 depicts radio frequency ("RF") circuitry 10 embedded in a wireless electronic system 100 and coupled to a processor 37 in accordance with at least some illustrative embodiments. The circuitry 10 is capable of acquiring broadcast messages ("messages") comprising RF signals that are acquired by an antenna 12 and amplified by a low noise amplifier ("LNA") 14. The output of the LNA 14 is provided to an in-phase mixer 16 and to a quadrature mixer 18. A local oscillator ("LO") provides a signal to a quadrature signal generator 20. The quadrature signal generator 20 provides the LO signal to mixer 16 and a quadrature version of the LO signal to mixer 18. In this manner, the RF signals may be directly "down-converted" or brought down to the lower frequency baseband signal range without first down converting to an intermediate frequency ("IF").

The magnitude of the signal acquired by the antenna 12 varies based upon the distance between circuitry 10 and the transmitter; this variation is sometimes referred to as "dynamic range". In the case of a base station as the transmitter, if a wireless electronic system is close to the base station, then the signal strength is large whereas if the wireless electronic system is far from the base station, then the signal strength is weak. In practice, the dynamic range may be on the order of 100 dB or a ratio of 100,000:1.

In order to accommodate such a large dynamic range, variable gain amplifiers ("VGAs") 22-25 amplify or attenuate mixed signals from mixers 16 and 18. However, amplifiers 22-25 also amplify undesired signals. Low pass filters ("LPFs") 26 and 28 block at least some of the undesired signals. Analog to digital converters ("ADCs") 30 and 32 convert the analog baseband signal into a digital signal for further signal processing by digital filters 34 and 36 and digital baseband processor ("Processor") 37. The Processor 37 may decode the digital signal according to one of the many supported wireless communications standards.

The ADCs 30, 32 have a range of analog values (both in terms of frequency and magnitude) that they are capable of converting to a digital value. Analog values that have a magnitude above the upper limit of the magnitude range may saturate the ADCs 30, 32. The VGAs 22-25 strive (under the control of the Processor 37) to keep the input to the ADCs 30, 32 within a desired range of analog magnitude values that the ADCs 30, 32 are capable of converting to digital values without saturation. ADCs 30, 32 are driven by a sample clock of frequency $F_S$. If the sample clock frequency $F_S$ is not more than twice the maximum frequency of the sampled signal (a limit known as the Nyquist frequency), then ADCs 30, 32 will undesirably generate aliased versions of the converted signals. Accordingly, the LPF 26 and 28 may be designed to limit the signal spectrum to less than half the Nyquist frequency. Alternatively, anti-alias filters may be implemented before the ADCs 30, 32 to limit the frequency range of the sampled analog signal to less than half the Nyquist frequency, thus minimizing the interference introduced by the aliased signals on the desired signal.

In at least some embodiments, a decoder module 38 is coupled to the digital filters 34, 36 and to the Processor 37. When a broadcast message is sent to the wireless electronic system, the decoder module 38 is configured to recognize the message after only acquiring less than one complete burst, and to consequently send a signal to the Processor 37. In at least some embodiments, the decision to send the signal is also based on radio conditions over the wireless channel. In at least some embodiments, the decoder module 38 comprises a detector module 39 and a memory module 40 used respectively to detect and store radio conditions. If the correct response to the recognized message is inaction (e.g. if the message is not directed toward the wireless electronic system 100), upon receiving the signal, the Processor 37 decreases power to the RF circuitry 10. In various embodiments, the Processor 37 decreases power before the circuitry 10 has completed acquiring the entire message, as illustrated in FIG. 2.

Figure 2A:
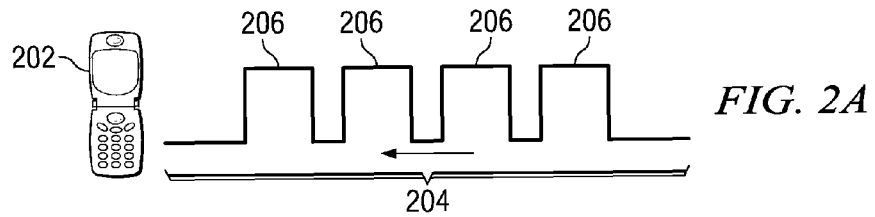
FIGS. 2A-2D illustrate a complete message and portions of a complete message in accordance with at least some illustrative embodiments.
Figure 2B:
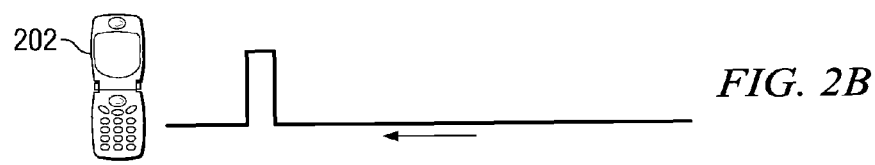
Figure 2C:
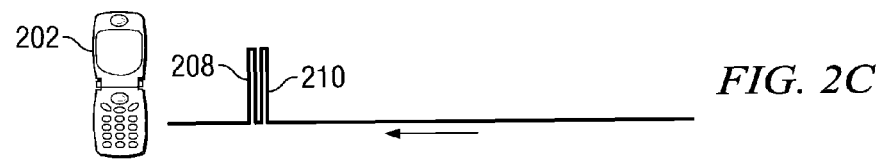
Figure 2D:
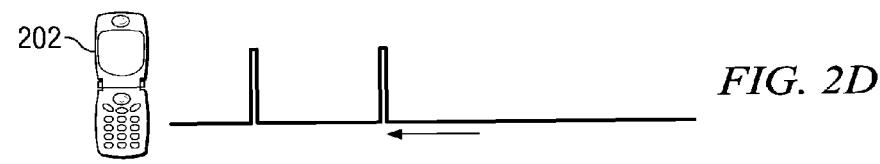

FIG. 2A illustrates a wireless electronic system 202 and an entire message 204 comprising four individual bursts 206. However, a wireless electronic system 202 with the embedded RF circuitry 10 need not acquire the entire message 204 before taking the correct responsive action or inaction. Rather, in at least some embodiments, the wireless electronic requires only half a burst, as illustrated in FIG. 2B. The half burst illustrated in FIG. 2B does not represent the transmitted message; all four bursts are still transmitted. Rather, FIG. 2B illustrates the amount of the message the wireless electronic system 202 acquires. Once the message 204 is recognized from the half burst as not being addressed to the wireless electronic system, the reminder of the message is not acquired because the RF circuitry is powered down. FIGS. 2C and 2D are similarly illustrated, but the message is recognized using less than half a burst.

In various embodiments, the message is recognized from multiple portions of the same burst or multiple portions of different bursts as illustrated in FIGS. 2C and 2D respectively. In at least some embodiments, multiple portions of a burst or bursts are used because messages use different types of bursts. For example, Table 1 illustrates the format of a "normal burst." Referring to FIG. 2C, the wireless electronic system acquires the first portion to ascertain that the burst comprises a normal burst. In at least some embodiments, the first portion 208 comprises bit numbers 3-60. Armed with this information, the RF circuitry 10 is powered down for the training sequence bits (bit numbers 61-86) and powered up to acquire the second portion 210. In at least some embodiments the second portion comprises bit numbers 87-144; however, the number and position of bits acquired are not static values. Once the message is recognized and the appropriate response is inaction, no further bits should be acquired and the RF circuitry 10 should be powered down regardless of how many bits were acquired. Hence, the message may be recognized on bit number 90 in one instance, bit number 5 in another instance, and bit number 62 in another instance, and in each instance, all subsequent bits in the message are not acquired. In at least some embodiments, powering down the circuitry occurs only until the next message arrives. Powering the circuitry in time for the next message is possible because messages arrive at regular intervals, and hence their arrival may be predicted.

TABLE 1

Format of a Normal Burst

| Bit Number (BN) | Length of field | Contents of field |
| --- | --- | --- |
| 0-2 | 3 | tail bits |
| 3-60 | 58 | encrypted bits (e0-e57) |
| 61-86 | 26 | training sequence bits |
| 87-144 | 58 | encrypted bits (e58-e115) |
| 145-147 | 3 | tail bits |
| 148-156 | 8.25 | guard period bits (optional) |

Preferably, the RF circuitry 10 is powered during the time windows corresponding to specific network message information, e.g. encrypted bits, until message recognition. As such, the RF circuitry 10 will be powered for a shorter time than if all four bursts were acquired, resulting in less power being consumed. Considering the aggregate reduction in power consumption due to the total amount of broadcast messages a wireless electronic system 202 acquires, in at least some embodiments battery life in the wireless electronic system 202 will increase.

The time window can be further narrowed to correspond to the desired information, resulting in a further reduction in power consumption. For example, in at least some embodiments, the wireless electronic system 202 acquires only the unique identifier in the message. The unique identifier comprises the bits of a message that indicate to which wireless electronic system the message is directed. Referring again to the embodiment of FIG. 1, the decoder module 38 recognizes that the message is an empty paging messaging, which is directed to no particular wireless electronic system, and sends a signal to the Processor 37 based upon the recognition. Consequently, the Processor 37 will power down the RF circuitry 10, which will cease to acquire the rest of the message.

Figure 3:
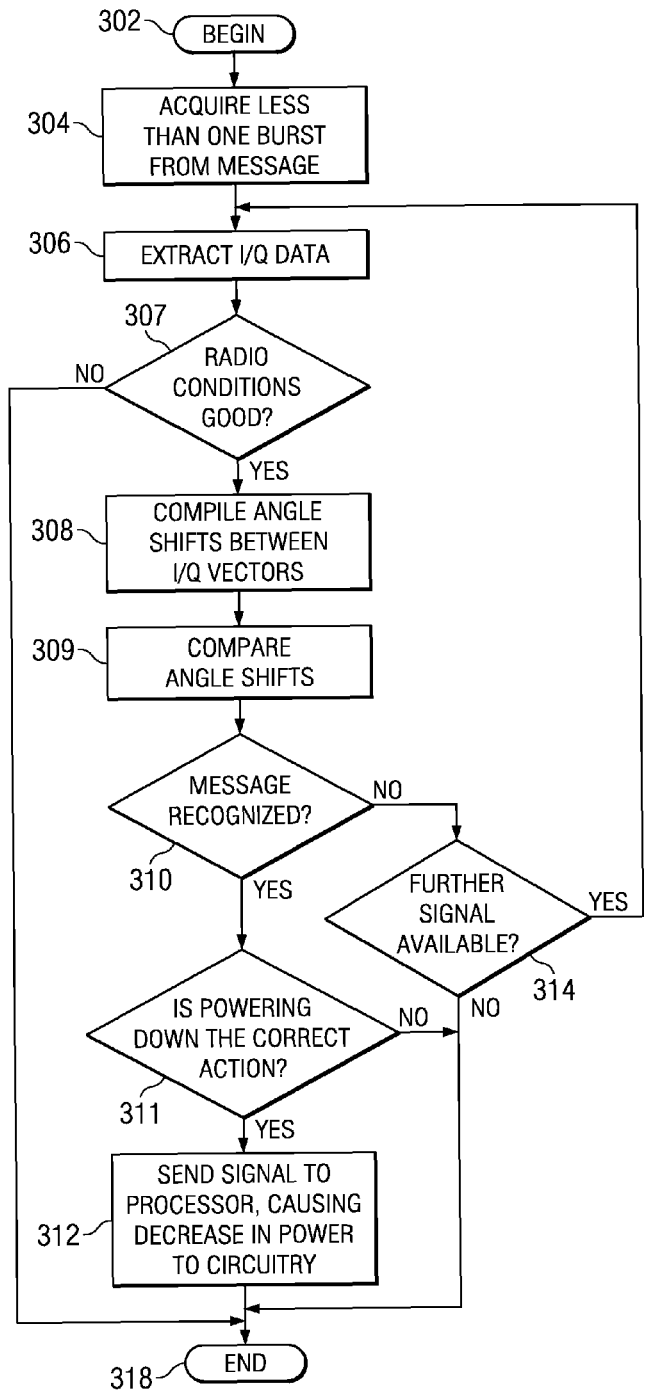
FIG. 3 illustrates a method for limiting the power consumption in a wireless electronic system in accordance with at least some illustrative embodiments.

However, considering that a) only a few bits of the message are acquired, b) the wireless channel may be noisy and cause bit errors, the bit-error-rate may not be tolerable. In at least some embodiments, various conditions are placed upon the reliability of the wireless channel before relying on the acquired bits to power down the circuitry 10. FIG. 3 illustrates a method for recognizing messages and determining thresholds of radio conditions that provide tolerable bit-error-rates.

FIG. 3, beginning at block 302 and ending at block 318, illustrates a method for reducing power to a wireless electronic system. In various embodiments, less than a complete burst of data is acquired (block 304). The less than complete burst may include, for example, half of a burst (FIG. 2B), multiple portions of the same burst (FIG. 2C), or different bursts (FIG. 2D). In at least some embodiments, the specific portion of the burst that is acquired is the portion containing the unique code identifying the wireless electronic system for which the message comprising the burst is intended. The specific portion of the burst that is acquired is selected according to the type of burst transmitted (e.g. normal burst) and any other information desired to be acquired (e.g. network message information).

At block 306 of FIG. 3, I/Q data, so named for the real and imaginary axes of the Cartesian coordinate system, is extracted from the message. As sent, transmitted data in the message takes the form of magnitude and phase data. I/Q data can be extracted by translating the magnitude and phase data from polar coordinates to Cartesian coordinates using the equations:

$$I(t) = M(t) * \cos(\emptyset(t)) \text{ and} \quad (1)$$

$$Q(t) = M(t) * \sin(\emptyset(t)), \quad (2)$$

where M(t) is the magnitude of the data with respect to time, and ø(t) is the phase of the data with respect to time. The extracted I/Q data takes the form of vectors of various magnitudes and angles from the origin.

Next, a determination is made as to whether radio conditions are favorable on the wireless channel (block 307). In at least some embodiments, determining favorable radio conditions comprises determining whether the deviation of the magnitudes of the extracted vectors is below a threshold corresponding to, for example, approximately a 20 dB signal-to-noise ratio. In at least some embodiments, the deviation is computed using the L1-norm, i.e., computing the sum of absolute values of the differences between the mean of magnitudes and each magnitude. In other embodiments, the deviation is computed using the L2-norm, i.e., the RMS Standard Deviation. Favorable radio conditions increase the probability of acquiring the correct bits without needing to acquire any training sequence bits. If radio conditions are not favorable, the method is terminated (block 318). In other embodiments, radio conditions are considered favorable if the signal-to-noise ratio is above approximately −96 dBm0. In still other embodiments, radio conditions are considered favorable if the bit-error-rate is less than approximately 0.01%. Other conditions and combinations of conditions will become obvious to those skilled in the art, including the combination of the conditions described above, and all such conditions and combinations are within the scope of the present disclosure.

Referring to both FIGS. 1 and 3, after detecting favorable radio conditions, the angles of successive I/Q vectors are compiled into a list of angle shifts (block 308). The list of angle shifts is compared with a second list of angle shifts stored in the wireless electronic system (block 309). In at least some embodiments, the second list of angle shifts has already been compiled into a list. The second list of angle shifts corresponds to a known message. If the lists are similar, e.g. if the lists have an absolute difference of less than 70 degrees, the message is recognized as the known message corresponding to the second list of angle shifts (block 310), and no further information need be acquired from the bursts or the message in order for the correct responsive action or inaction to occur. Hence, for example, if the lists are compared and the message is recognized as an empty paging message, the correct response is inaction (block 311), and a signal is sent to the processor (block 312). Consequently, the processor commands power to be reduced in the RF circuitry 10, and the remaining bursts in the empty paging message are not acquired. Empty paging messages are null messages indicating there is no relevant information for which the wireless electronic system need respond, and thus a command to power down the RF circuitry 10 is appropriate.

However, the message need not be an empty paging message in order to achieve reduced power consumption. The message need only be recognized before the entire message is acquired. For example, if a partial burst is recognized as indicating an update to the time, the Processor 37 will signal a power down after receiving the portion of the message containing the time update. The rest of the message is not acquired, and a similar reduction in power consumption results. However, if the correct responsive action is not powering down the circuitry 10, then the method terminates (block 318).

If the lists are dissimilar, e.g. if the lists have an absolute difference of greater than or equal to 70 degrees, the message cannot be recognized without further information (block 314). If there are portions of the bursts not included in the initial extraction (block 306), part of the method is repeated in an attempt to recognize the message. Otherwise, the method terminates (block 318). In various embodiments, the entries in the lists of angle shifts are relative to each other, and the second list of angle shifts is calculated from a second set of I/Q vectors stored in the wireless electronic system. In at least some embodiments, the second list of angle shifts corresponds to a message commonly acquired by wireless electronic systems.

In various embodiments, multiple lists of angle shifts corresponding to multiple messages are stored in the wireless electronic system so multiple comparisons may be made. In such embodiments, the first list of angle shifts is compared to a stored second list of angle shifts. If it is determined they are not similar, the first list of angle shifts is compared to a stored third list of angle shifts, and then to a fourth list if needed, and so forth.

In various embodiments, a third list of angle shifts is derived from a previously unrecognized message. For example, the first list of angle shifts is compared to a stored second list of angle shifts. If it is determined that they are not similar, the first list of angle shifts is stored, along with its corresponding message once the message is fully acquired, as a third list of angle shifts. Subsequently, another partial burst is acquired, and a fourth list of angle shifts is compiled. The fourth list of angle shifts is compared with the second list of angles shifts. If it is determined that they are not similar, the fourth list of angle shifts is compared with the newly stored third list of angle shifts from the previously unrecognized message, etc.

Figure 4:
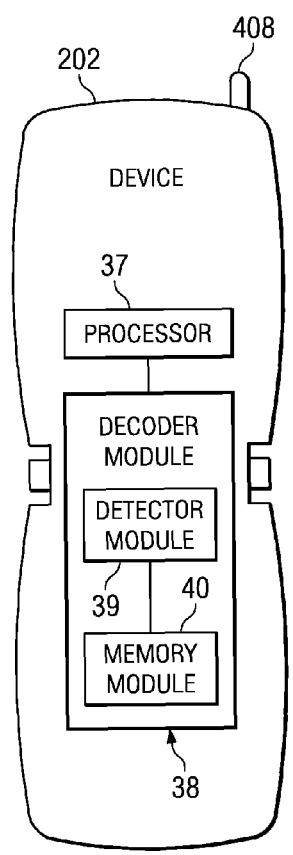
FIG. 4 illustrates a wireless electronic system in accordance with at least some illustrative embodiments.

In various embodiments, the second list of angle shifts is already stored on the wireless electronic system at the time of sale, and in at least some embodiments, the wireless electronic system is a cellular phone as illustrated in FIGS. 2 and 4.

FIG. 4 illustrates a possible hardware implementation according to at least some embodiments of the disclosure. FIG. 4 illustrates a cellular phone 202 comprising a decoder module 38 that performs the method illustrated in FIG. 3 and a Processor 37. The decoder module 38 comprises a detector module 39 and a memory module 40. When a broadcast message is sent to the cellular phone 202, the detector module 39 is configured to recognize the message, after only acquiring less than one complete burst, and consequently sending a signal to the Processor 37. In at least some embodiments, the decision to send the signal is also based on radio conditions over the wireless channel detected by the detector module 39. The detector module 39 extracts the I/Q data patterns, compiles the angle shifts, and compares the angle shifts as described above. The memory module 40 stores the I/Q data patterns and lists of angle shifts for comparison purposes. In at least some embodiments, the detector module 39 is located in the antenna 408 of the cellular phone 202. Upon receiving the signal, the Processor 37 decreases power to the cellular phone 202. In various embodiments, the Processor 37 decreases power before the detector module 39 has completed acquiring the entire message.

The above disclosure is meant to be illustrative of the principles and various embodiment of the present invention. Numerous variations and modifications will become apparent to those skilled in the art once the above disclosure is fully appreciated. For example, the responsibilities of the decoder module may be distributed among a number of different modules, or a type of burst not discussed in this document may be recognized. It is intended that the flowing claims be interpreted to embrace all such variations and modifications.

What is claimed is:

1. A wireless electronic system, comprising:
   a processor;
   a decoder module coupled to the processor, the decoder module configured to send a signal to the processor based on a less than completely acquired burst of data, the less than completely acquired burst of data being part of a complete burst of data, the complete burst of data being contiguous;
   wherein the processor causes a reduction in power consumption of the wireless electronic system based on the signal; and
   wherein the decoder module is configured to:
   extract a first I/Q data pattern from the less than completely acquired burst of data;
   compare the first I/Q data pattern to a second I/Q data pattern, the second I/Q data pattern, extracted from a second message, stored in the wireless electronic system; and
   send the signal to the processor if the first I/Q data pattern matches the second I/Q data pattern.

2. The wireless electronic system of claim 1, wherein the decoder module is configured to send the signal based on multiple portions of the less than completely acquired burst of data.

3. The wireless electronic system of claim 1, wherein the reduction in power consumption comprises a reduction in power consumption of radio circuitry embedded in the wireless electronic system.

4. The wireless electronic system of claim 1, wherein the reduction in power consumption occurs at least during any remainder of a message comprising the less than completely acquired burst of data.

5. The wireless electronic system of claim 1, wherein the less than completely acquired burst of data comprises half of the complete burst of data.

6. The wireless electronic system of claim 1, wherein the less than completely acquired burst of data is acquired during time windows corresponding to specific network message information.

7. The wireless electronic system of claim 1, wherein the decoder module is configured to:
   recognize a message comprising the less than completely acquired burst of data; and
   send the signal to the processor based on recognition of the message.

8. The wireless electronic system of claim 7, wherein the message is an empty paging message.

9. The wireless electronic system of claim 1, wherein the decoder module is further configured to:
   determine radio conditions of a wireless channel; and
   send the signal to the processor based on the radio conditions.

10. The wireless electronic system of claim 1, wherein the decoder module is configured to:
    determine a signal-to-noise ratio of the wireless channel; and
    send the signal to the processor if the signal-to-noise ratio is above a threshold.

11. The wireless electronic system of claim 1, wherein the decoder module configured to compare the first I/Q data pattern to a second I/Q data pattern comprises the decoder module configured to:
    compile a first set of angle shifts between I/Q vectors in the first I/Q data pattern;
    compile a second set of angle shifts between I/Q vectors in a second I/Q data pattern; and compare the first set of angle shifts to the second set of angle shifts.

12. A wireless electronic system, comprising:
a processor;
a decoder module coupled to the processor, the decoder module configured to send a signal to the processor based on a less than completely acquired burst of data, the less than completely acquired burst of data being part of a complete burst of data, the complete burst of data being contiguous;
wherein the processor causes a reduction in power consumption of the wireless electronic system based on the signal; and
wherein the decoder module is configured to:
extract I/Q vectors from the less than completely acquired burst of data;
determine a deviation of magnitudes of the I/Q vectors; and
send the signal to the processor if the deviation is below a threshold.

13. A method, comprising:
acquiring a less than complete burst of data, the less than complete burst of data being part of a complete burst of data, the complete burst of data being contiguous;
recognizing a message comprising the less than complete burst of data; and
reducing power in a wireless electronic system, during any remainder of the message, based on the message;
wherein recognizing the message comprises:
detecting radio conditions;
extracting a first I/Q data pattern from the less than complete burst of data based on the radio conditions; and
comparing the first I/Q data pattern to a stored second I/Q data pattern based on the radio conditions.

14. The method of claim 13, wherein acquiring the less than complete burst comprises acquiring the less than complete burst of data during time windows corresponding to specific network message information.

15. The method of claim 13, wherein comparing the first I/Q data pattern comprises:
computing a first set of angle shifts between I/Q vectors in the first I/Q data pattern;
computing a second set of angle shifts between I/Q vectors in a second I/Q data pattern; and
comparing the first set of angle shifts to the second set of angle shifts.

16. A decoder module, comprising:
a detector module configured to send a signal to a processor based on:
a less than completely acquired burst of data, the less than completely acquired burst of data being part of a complete burst of data, the complete burst of data being contiguous; and
radio conditions determined by the detector module; and
a memory module coupled to the detector module,
wherein the detector module:
extracts a first I/Q data pattern from the less than completely acquired burst of data; and
compares the first I/Q data pattern to a second I/Q data pattern stored in the memory module.

17. The decoder module of claim 16, wherein the less than completely acquired burst of data comprises data acquired during time windows corresponding to specific network message information.

18. The decoder module of claim 16, wherein the detector module:
compiles a first set of angle shifts between I/Q vectors in the first I/Q data pattern;
compiles a second set of angle shifts between I/Q vectors in a second I/Q data pattern; and
compares the first set of angle shifts to the second set of angle shifts.

* * * * *